Patented Oct. 22, 1935

2,017,936

UNITED STATES PATENT OFFICE 2,017,936

AROYLAMINO ANTHRAQUINONE ACRIDONE DERIVATIVE

Fritz Baumann, Leverkusen-I. G. Werk, Germany, assignor to General Aniline Works, Inc., New York, N. Y., a corporation of Delaware No Drawing. Application June 21, 1933, Serial No. 676,979. In Germany June 25, 1932

6 Claims. (Cl. 260—37)

The present invention relates to a process of preparing aroylamino-anthraquinone acridone derivatives and to the new anthraquinone acridone derivatives obtained by said process.

In accordance with the invention new anthraquinone acridone derivatives are prepared by reacting upon an 1,4-diaroylamino-5-aminoanthraquinone with a substituted or an unsubstituted ortho halogen carboxylic acid of the benzene-, naphthalene-, anthracene- or anthraquinone series, and causing acridone ring formation of the intermediate product thus obtainable according to usual methods. In case saponification of the aroylamino groups has occurred during the ring closing process, the reaction products should be aroylated again. However, it is to be pointed out that in all cases the saponification of the aroyl amino groups can be avoided when performing the ring closing process under rather mild conditions. A preferred method of closing the acridone ring is by starting with an ester of the ortho-halogencarboxylic acid and then causing ring closure by vatting of the intermediate product obtained. Any saponification of the aroylamino groups can thus be avoided. Other suitable ring closing methods are, for example, the heating of the intermediate products or of their esters with sulfuric acid, chlorosulfonic acid or a mixture of sulfuric acid with acetic acid anhydride or the transformation of the intermediate products into carboxylic acid halogenides, especially the chlorides, and then causing ring formation of the latter in the usual manner.

The starting anthraquinone derivatives, that is the 1,4 - diaroylamino - 5 - aminoanthraquinones, may be obtained by reacting upon 1,4-diamino-5-nitroanthraquinone with an aroylating agent, such as benzoylchloride, chlorobenzoylchloride, a dichlorobenzoylchloride, meta- or para-methoxybenzoylchloride, alpha- or beta-naphthoylchloride, the chloride of a diphenyl-monocarboxylic acid, the chloride of an anthraquinone carboxylic acid, aminoanthraquinone carboxylic acid, chloroanthraquinone carboxylic acid etc. and reducing the nitro group of the products thus obtained. Obviously, the starting anthraquinone derivatives may be further substituted in the nucleus, for example, by halogen atoms, alkyl groups or alkoxy groups.

The condensation of the starting anthraquinone derivatives with the ortho-halogen carboxylic acids or their esters is best performed while heating the reaction components in a high boiling indifferent organic solvent, such as chlorobenzene, trichlorobenzenes, nitrobenzene, naphthalene etc. to a temperature above about 100° C. Instead of the high boiling organic solvent, an excess of the carboxylic acid or the esters may be applied. Preferred temperature ranges are those between about 150 and about 250° C. Higher or lower temperatures are likewise operable. Advantageously, an acid binding agent, such as sodium or potassium acetate, sodium or potassium carbonate or bicarbonate etc. and, furthermore, a copper catalyst, such as copper itself, copper oxide, copper chloride, cuprous bromide, copper acetate etc. is added to the reaction mixture.

According to a further feature of the present invention the same anthraquinone acridone derivatives, the manufacture of which is disclosed above, can be obtained by reacting upon an 1,4-diaroylamino-5-halogenanthraquinone or a substitution product thereof with an ortho-aminocarboxylic acid of the benzene-, naphthalene-, anthracene- or anthraquinone series, or an ester thereof and then causing acridone ring formation. The more detailed method of working is the same as disclosed for the process mentioned first, and it is to be pointed out that this second process can be considered equivalent to said first process.

The products thus obtainable correspond to the probable formula:—

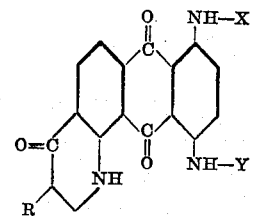

wherein X and Y mean similar or dissimilar aroyl radicals, R stands for a radical of the benzene-, naphthalene-, anthracene- or anthraquinone series. Generally, they form blue to bluish green crystals, dissolving in concentrated sulfuric acid with a yellow to green coloration, dyeing cotton from an alkaline hydrosulfite vat strong and clear blue to bluish-grey shades of excellent fastness properties, also to chlorine.

Of particular value are the products in which X and Y are aryl radicals of the benzene series and R is likewise a radical of the benzene series, since they dye especially strong and clear shades.

The following examples illustrate the invention, without, however, restricting it thereto, the parts being by weight:—

Example 1

The reduction of 1,4-dibenzoylamino-5-nitroanthraquinone, obtainable by carefully benzoylating 1,4-diamino-5-nitroanthraquinone, may be performed by means of hydrosulfite or sulfhydrate. Brownish-red prisms are obtained from quinoline, which dissolve in pyridine with a bluish-red coloration. 30 parts of ortho-bromobenzoic acid methyl ester, 30 parts of 1,4-dibenzoylamino-5-aminoanthraquinone, 20 parts of anhydrous potassium acetate and 0.3 part of copper powder are heated to boiling in 180 parts of nitrobenzene in a reflux condenser, until the melt does not change its color any more and a test portion poured into pyridine dissolves with a violet coloration. After cooling the brownish-red crystals are sucked off, washed with nitrobenzene and alcohol and, finally, the filter cake is boiled with dilute hydrochloric acid. After repeated crystallization from nitrobenzene the ester obtained is absolutely pure. It is soluble in sulfuric acid with a yellowish-brown coloration.

10 parts of the ester thus obtained are well suspended within 100 parts of pyridine, the paste is mixed with 600 parts of water, and the whole is heated in a closed flask to a temperature of 35° C. Thereupon 14 parts of sodium hydrosulfite and 35 parts of caustic soda solution (33%) are gradually added, and the reaction mixture is stirred for some time at a temperature of about 30-40° C., until the originally olive green coloration of the mixture has changed to reddish-violet owing to the formation of the acridone ring closure. The dyestuff is separated by the addition of an oxidizing agent, for example, by blowing air into the solution.

The 1,4-dibenzoylaminoanthraquinone-6,5(N)-1',2'(N)-benzacridone is precipitated in blue crystals, which are collected on the filter and well washed with hot water. After drying, a blue powder is obtained, which crystallizes in needles from nitrobenzene; when pouring the orange-brown sulfuric acid solution into water, the dyestuff precipitates in blue flakes. Cotton is dyed from a violet vat bluish shades of excellent fastness to chlorine. The dyestuff may also be used for printing purposes.

When substituting the benzoyl residue by the meta-methoxy-benzoyl group, an acridone of very similar properties is obtained.

When treating 1,4-dibenzoylamino-5-nitroanthraquinone with an excess of benzoylchloride in nitrobenzene at a temperature of 160-200° C. or when benzoylating 1,4-diamino-5-nitroanthraquinone under the same conditions, the nitro group is substituted by chlorine with the formation of 1,4-dibenzoylamino-5-chloroanthraquinone. After conversion with anthranilic acid and subsequent acridone ring closure, 1,4-diaminoanthraquinone-6,5(N)-1',2'-(N)-benzacridone is obtained. Benzoylating in nitrobenzene yields again the 1,4-dibenzoylaminoanthraquinone-6,5(N)-1',2'(N)-benzacridone.

Example 2

10 parts of 1,4-dibenzoylamino-5-aminoanthraquinone, 10 parts of naphthalene-2-chloro-1-carboxylic acid methyl ester, 8 parts of anhydrous potassium acetate, 0.2 part of copper and 0.2 part of copper acetate are heated to boiling for about 3 hours in 60 parts of nitrobenzene. On cooling the ester crystallizes from the violet solution in bluish-black crystals, which dissolve in sulfuric acid with a yellowish brown coloration.

5 parts of the above ester, isolated in the customary manner, are vatted in 60 parts of pyridine water with the addition of 6 parts of sodium hydrosulfite and 15 parts of caustic soda solution (33%) at a temperature of 30-35° C. Stirring is continued until unchanged starting material cannot be detected any more and the solution has assumed a violet coloration. Thereupon the acridone is precipitated by introducing air and the dark brown paste is boiled up for a short time, whereby the dyestuff becomes crystalline. It is sucked off while hot, washed with hot water and dried. By recrystallization from nitrobenzene, which dissolves the dyestuff on heating with a reddish-violet coloration, the naphthacridone is precipitated in lustrous bluish-black needles, which dissolve in sulfuric acid with a yellowish-brown coloration.

Example 3

When converting according to the manner described above 2-bromo-naphthalene-3-carboxylic acid methyl ester with 1,4-dibenzoylamino-5-aminoanthraquinone, the 1,4-dibenzoylaminoanthraquinone-6,5-(N)-2',3'-(N)-naphthalene acridone is obtained. It dyes cotton from an olive vat bluish-grey shades. The dyestuffs can be recrystallized from nitrobenzene and dissolves in sulfuric acid with a green coloration.

I claim:—

1. The process which comprises reacting upon an 1,4-diaroylamino-5-aminoanthraquinone, the aryl group being of the benzene, naphthalene, diphenyl, anthracene or anthraquinone series, with an ortho-halogen-carboxylic acid of the benzene-, naphthalene-, anthracene or anthraquinone series, which acid may be esterified by a lower aliphatic alcohol, in the presence of a high boiling inert organic solvent at a temperature above about 100° C. and causing acridone ring formation of the reaction product thus obtained according to usual methods.

2. The process as claimed in claim 1, in which an acid binding agent and a copper catalyst is present in the reaction mixture.

3. The process as claimed in claim 1, in which a temperature between about 150 and about 250° C. is applied during the condensation reaction and the reaction is performed in the presence of an acid binding agent and of a copper catalyst.

4. The process which comprises reacting upon a compound of the formula:—

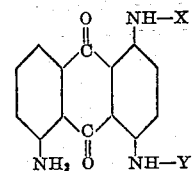

wherein X and Y mean aroyl radicals of the benzene series with a benzene-ortho-halogen-carboxylic acid ester of a lower aliphatic alcohol, in the presence of an acid binding agent and of a copper catalyst, at a temperature between about 150 and about 250° C. and causing acridone ring formation of the reaction product thus obtained according to usual methods.

5. The products of the general formula:—

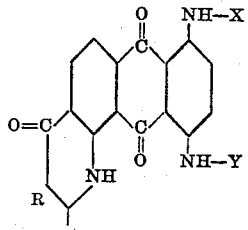

wherein X and Y mean aroyl radicals of the benzene series, R stands for a radical of the benzene series, said compounds forming blue to bluish grey needles, dissolving in concentrated sulfuric acid with a yellow to green coloration, dyeing cotton from an alkaline hydrosulfite vat clear and strong shades of excellent fastness properties, also to chlorine.

6. The product having the formula:—

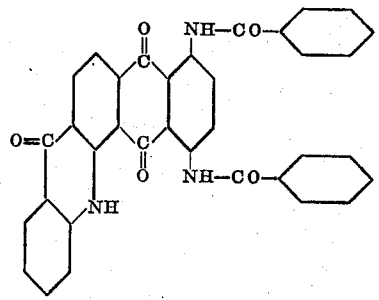

said compound dyeing cotton from an alkaline hydrosulfite vat strong and clear blue shades of excellent fastness properties also to chlorine.

FRITZ BAUMANN.